United States Patent
Jeon et al.

(10) Patent No.: US 12,185,099 B2
(45) Date of Patent: Dec. 31, 2024

(54) MODULE AND METHOD FOR TRANSMITTING INFORMATION USING WIRELESS HIDDEN SIGNAL

(71) Applicant: ELECTRONICS AND TELECOMMUNICATIONS RESEARCH INSTITUTE, Daejeon (KR)

(72) Inventors: Yong Sung Jeon, Daejeon (KR); Ha Young Seong, Daejeon (KR); Sang Woo Lee, Daejeon (KR); You Sung Kang, Daejeon (KR); Ik Kyun Kim, Daejeon (KR); Mi Kyung Oh, Daejeon (KR); Sang Jae Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 224 days.

(21) Appl. No.: 17/967,957

(22) Filed: Oct. 18, 2022

(65) Prior Publication Data
US 2023/0156463 A1    May 18, 2023

(30) Foreign Application Priority Data
Nov. 18, 2021    (KR) .......... 10-2021-0159581

(51) Int. Cl.
*H04W 12/03* (2021.01)
*H04L 1/00* (2006.01)

(52) U.S. Cl.
CPC .......... *H04W 12/03* (2021.01); *H04L 1/0061* (2013.01)

(58) Field of Classification Search
CPC .......... H04W 12/03; H04L 1/0061
See application file for complete search history.

(56) References Cited

U.S. PATENT DOCUMENTS 6,865,168 B1 *  3/2005  Sekine .................. H04W 52/42
                                                            370/335
9,905,234 B2    2/2018  Baeck et al.
(Continued)

FOREIGN PATENT DOCUMENTS

KR    10-2008-0042664 A    5/2008
KR    10-1783440 B1        9/2017
(Continued)

OTHER PUBLICATIONS

Salvatore D'Oro, et al., "Hiding Data in Plain Sight: Undetectable Wireless Communications Through Pseudo-Noise Asymmetric Shift Keying", arXiv:1905.02250v1, May 6, 2019.
(Continued)

*Primary Examiner* — Ayoub Alata
(74) *Attorney, Agent, or Firm* — LRK PATENT LAW FIRM

(57) ABSTRACT

Provided is a module and method for transmitting information using a wireless hidden signal, which is capable of transmitting important information data requiring extreme security using a wireless hidden signal, and allowing the important information to be detected and distinguished by only promised transmitting/receiving parties so that the possibility of the wireless hidden signal being discovered can be minimized and security can be enhanced. The module for transferring information using a wireless hidden signal includes: a hidden formatting unit configured to generate a transmission data frame structure based on data that needs to be wirelessly transmitted; a hidden encoding unit configured to encode the generated transmission data frame structure to generate and output a hidden encoded bit stream; and a hidden modulation unit configured to convert the output hidden encoded bit stream into a wireless signal in a wireless transmission format.

16 Claims, 10 Drawing Sheets

(56) References Cited

U.S. PATENT DOCUMENTS

2016/0203824 A1 7/2016 Park et al.
2021/0227384 A1* 7/2021 Harley .............. H03M 13/6362

FOREIGN PATENT DOCUMENTS

| KR | 10-2227317 B1 | 3/2021 |
| KR | 10-2021-0059572 A | 5/2021 |
| WO | 2009/104234 A1 | 8/2009 |

OTHER PUBLICATIONS

Colin P. O'Flynn, "Message Denial and Alteration on IEEE 802.15.4 ow-Power Radio Networks", IEEE Conference Paper, Mar. 2011.

* cited by examiner

FIG. 3

DATA :  1 0 1 0 1 0 1 0 1 0

HIDDEN ENCODING : 1010000101000010100001010000010100001

MODULE AND METHOD FOR TRANSMITTING INFORMATION USING WIRELESS HIDDEN SIGNAL

CROSS-REFERENCE TO RELATED APPLICATION

This application claims priority to and the benefit of Korean Patent Application No. 10-2021-0159581, filed on Nov. 18, 2021, the disclosure of which is incorporated herein by reference in its entirety.

BACKGROUND

1. Field of the Invention

The present invention relates to a module and method for transmitting information using a wireless hidden signal, and specifically, to a module and method for transmitting information using a wireless hidden signal capable of improving security by minimizing the possibility of the wireless hidden signal being discovered.

2. Description of Related Art

In general, in order to transmit digital information in a specific system or device to an external device using a wireless signal, several operations are performed. Digital information is subject to operations consisting largely of an encoding operation and a modulation operation and then transmitted as a final wireless signal.

The encoding operation is largely divided into a source encoding operation that performs compression to reduce the amount of digital information, and a channel encoding operation for solving a problem of errors occurring due to various characteristics of wireless channels.

The modulation operation is to convert the strength, displacement, frequency, phase, etc. of a signal to obtain an appropriate waveform so that signal information suits the channel characteristics of a transmission medium.

The background technology of such operations required for transmitting digital information to an external device using a wireless signal will be described in more detail as follows.

An encoding operation is largely divided into two operations as follows

Source encoding: source encoding refers to a process of, when an input signal is an analog signal, generating a digital bit stream through sampling, and compressing the generated bit stream to remove redundancy. When an input signal is a digital bit stream, a compression process is basically performed. However, compression may not be needed, and data that does not require compression is not subject to compression.

Channel encoding: channel encoding refers to a signal conversion process performed at a transmitting source such that a receiving end checks errors occurring in a communication channel and corrects the errors. This is a conversion technique that allows digital converted signals to suit a transmission line such as by error detection.

The method of channel encoding for detecting or correcting an error of a communication channel include various methods, such as a Hamming code, a repetition code, and a turbo code. Hamming code is configured in a way to add k parity bits to n data bits to generate a new code word with n+k bits, to check bit value errors in a transmission process.

Repetition code is a very simple coding method in which each bit in a message to be transmitted is repeated a number of times. For example, a triple repetition code transmits a message bit value "0" as a transmission bit value "000" and transmits a message bit value "1" as a transmission bit value "111." Such a repetition code is characterized in that the length of encoded transmission bits is always an odd number, and even when some of the bit value is lost during transmission, the lost bit value may be recovered.

However, the channel encoding has a disadvantage in that the transmission speed is lowered because additional bits other than actual data bits are added for error verification or recovery. Therefore, in the channel encoding method, it is most important to minimize a decrease in transmission speed while enabling error verification and recovery.

The background technology of the modulation operation will be described as follows.

Representative examples of digital modulation include amplitude-shift keying (ASK), frequency-shift keying (FSK), and phase-shift keying (PSK).

ASK is a method of transmitting 0 and 1 of a digital signal by adjusting the amplitude of a signal. That is, a signal continuing at a high amplitude for a certain period of time is 1 and continuing at an amplitude of 0 for a certain period of time is 0, which is referred to as 100% ASK.

FSK is a method of representing 0 and 1 using two different frequencies. For example, continuing at a high frequency for a certain period of time is 1, and continuing at a low frequency for a certain period is 0. PSK is a method of representing a signal of 0 and 1 by changing the phase of a signal.

Meanwhile, a wireless communication device has a benefit of easily transmitting desired information over a long distance without being restricted by location and movement. Examples of the method of secretly transmitting information using a wireless signal include a method using a non-communication wireless signal, such as sound, light, heat, and magnetic fields, and a method using a wireless signal for communication composed of its own protocol, such as wireless-fidelity (WiFi) and Long Term Evolution (LTE).

The existing method of secretly transmitting information using a non-communication wireless signal has a disadvantage in that wireless hidden signals consecutively occur during a period of transmitting information, so that the possibility of the wireless hidden signal being discovered is increased. The existing method of secretly transmitting information using a communication wireless signal has a disadvantage in that, because only signals outside a normal range are used, there is a possibility that a signal generated to transmit hidden information is easily recognized as being abnormal.

RELATED ART DOCUMENTS

Patent Document: Korean Laid-open Patent Publication No. 10-2019-0147203

SUMMARY OF THE INVENTION

The present invention is directed to providing a module and method for transmitting information using a wireless hidden signal, which is capable of transmitting important information data requiring extreme security using a wireless hidden signal, and allowing the important information to be detected and distinguished by only promised transmitting/ receiving parties so that the possibility of the wireless hidden signal being discovered may be minimized and security may be enhanced.

The technical objectives of the present invention are not limited to the above, and other objectives may become apparent to those of ordinary skill in the art based on the following description.

According to an aspect of the present invention, there is provided a module for transferring information using a wireless hidden signal, the module including: a hidden formatting unit configured to generate a transmission data frame structure based on data that needs to be wirelessly transmitted; a hidden encoding unit configured to encode the generated transmission data frame structure to generate and output a hidden encoded bit stream; and a hidden modulation unit configured to convert the output hidden encoded bit stream into a wireless signal in a wireless transmission format.

The hidden formatting unit may be configured to divide the data into a plurality of fields and combine the fields to generate the transmission data frame structure.

The field may include a preamble field, a start frame delimiter (SFD) field, a nonce field, a covert SFD field, a header field, a payload field, and a cyclic redundancy check (CRC) field.

The hidden formatting unit may encrypt the data corresponding to a plaintext data frame into a hidden data frame including a separate hidden data field.

The hidden formatting unit may perform a hash operation on a header field, a payload field, and a CRC field of a structure of the plaintext data frame and perform an exclusive-OR (XOR) operation on output values output through the hash operation, the output values starting from a third byte among the output values and corresponding to a length summating a length of the header field, a length of the payload field, and a length of the CRC field to generate the hidden data field.

The hidden formatting unit may be configured to, for the encrypted hidden data frame, set a value obtained by combining key data, SFD data, and nonce data as a hash function input value of the hidden data frame, allow a transmitting device and a receiving device sharing the hidden data frame to share the key data with each other, and allow the receiving device having received the hidden data frame from the transmitting device to perform a hash function operation on the hidden data frame based on the hash function input value, and perform an XOR operation on a result value of the hash function operation and the hidden data frame to reversely calculate the header field, the payload field, and the CRC field included in the plaintext data frame.

The payload field may be generated to have a capacity of 17 bytes.

Among a plurality of first and second bit values constituting the hidden encoded bit stream, the hidden encoding unit may form a distribution of the first bit values to be greater than a distribution of the second bit values.

The hidden encoding unit may generate the hidden encoded bit stream using a method of repeating a first bit value a different number of times according to an information bit value to encode each information bit value and arranging a second bit value between encoding results of neighboring information bit values.

When a specific bit value among first and second bit values included in the hidden encoded bit stream is lost, the hidden encoding unit may infer and recover the lost specific bit value using a position of the corresponding lost specific bit value and positions of the first and second bit values in an entire array of the hidden encoded bit stream.

The hidden modulation unit may convert the hidden encoded bit stream into the wireless signal, wherein, when an input bit value of the hidden encoded bit stream is a first bit value, the converted wireless signal is prevented from being transmitted from a transmitting device to a receiving device; and when an input bit value of the hidden encoded bit stream is a second bit value, the converted wireless signal is allowed to be transmitted from a transmitting device to a receiving device.

According to another aspect of the present invention, there is provided a method of transferring information using a wireless hidden signal, the method including: generating a transmission data frame structure based on data that needs to be wirelessly transmitted; encoding the generated transmission data frame structure to generate and output a hidden encoded bit stream; and converting the output hidden encoded bit stream into a wireless signal in a wireless transmission format.

The generating of the transmission data frame structure may include dividing the data into a plurality of fields, and combining the fields to generate the transmission data frame structure.

The generating of the transmission data frame structure may include encrypting the data corresponding to a plaintext data frame into a hidden data frame including a separate hidden data field.

The generation and output of the hidden encoded bit stream may include, among a plurality of first and second bit values constituting the hidden encoded bit stream, forming a distribution of the first bit values to be greater than a distribution of the second bit values.

The converting of the output hidden encoded bit stream into the wireless signal may include converting the hidden encoded bit stream into the wireless signal, wherein, when an input bit value of the hidden encoded bit stream is a first bit value, the converted wireless signal is prevented from being transmitted from a transmitting device to a receiving device; and when an input bit value of the hidden encoded bit stream is a second bit value, the converted wireless signal is allowed to be transmitted from a transmitting device to a receiving device.

The method may further include transmitting the wireless signal to a receiving device.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is a diagram illustrating a concept of a hidden encoded bit stream generated by a hidden encoding unit 120;

DETAILED DESCRIPTION OF EXEMPLARY EMBODIMENTS

Hereinafter, exemplary embodiments of the present invention will be described in order to facilitate understanding of the present invention. However, the following examples are provided only for the purpose of easier understanding of the present invention, and the present invention is not limited by the following examples.

The present invention relates to a module and method for transferring information using a wireless hidden signal. The present invention is implemented to transmit important information data requiring extreme security using a wireless hidden signal, and allow the important information data to be detected and distinguished by only promised transmitting/receiving parties, thereby minimizing the possibility of the wireless hidden signal being discovered and increasing security.

Figure 1:
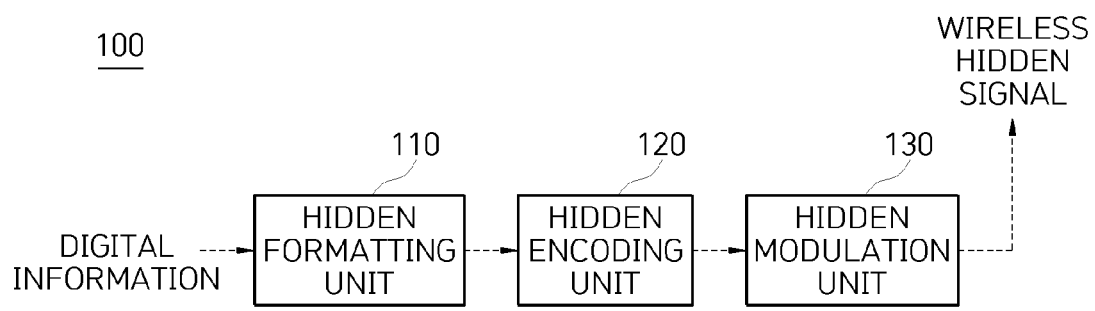
FIG. 1 is a diagram illustrating a configuration and concept of an information transfer module 100 using a wireless hidden signal according to the present invention.
Figure 2:
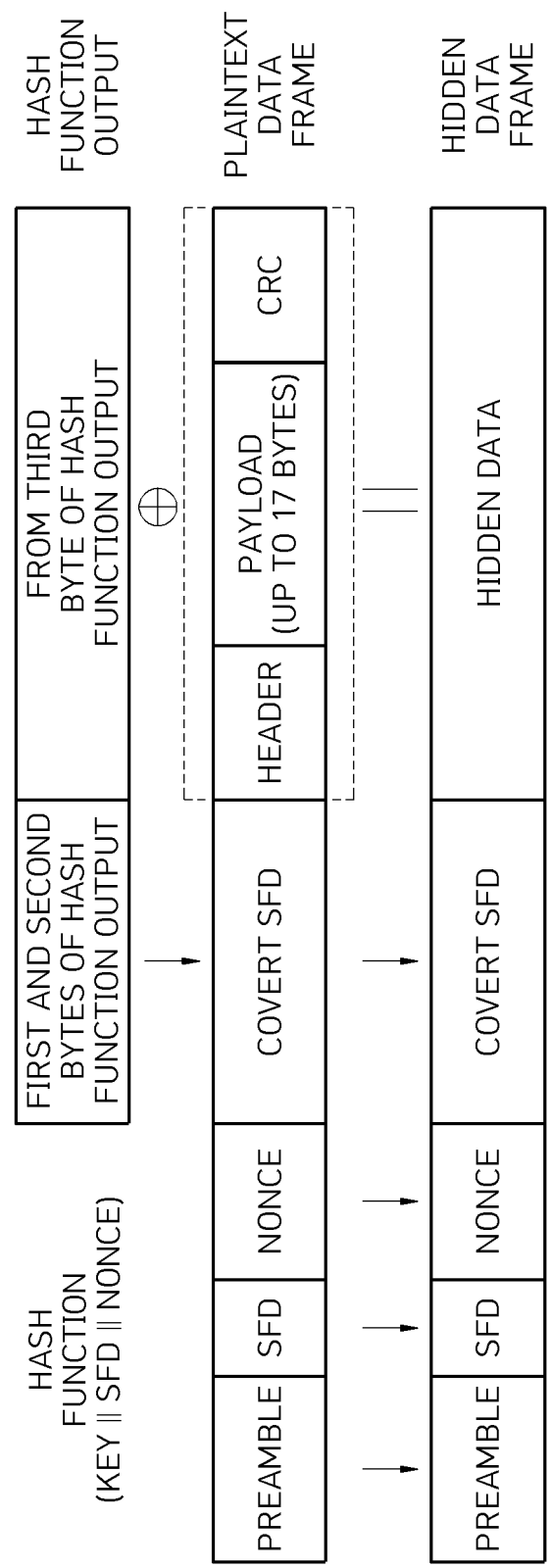
FIG. 2 is a diagram illustrating a concept of a structure of a transmission data frame generated by a hidden formatting unit 110.

FIG. 1 is a diagram illustrating a configuration and concept of an information transfer module 100 using a wireless hidden signal according to the present invention, FIG. 2 is a diagram illustrating a concept of a structure of a transmission data frame generated by a hidden formatting unit 110, and FIG. 3 is a diagram illustrating a concept of a hidden encoded bit stream generated by a hidden encoding unit 120.

Referring to FIGS. 1 to 3, a module 100 for transferring information using a wireless hidden signal according to an embodiment of the present invention is largely divided into a hidden formatting unit 110, a hidden encoding unit 120, and a hidden modulation unit 130.

The hidden formatting unit 110 may generate a transmission data frame structure based on data that needs to be wirelessly transmitted, that is, digital information.

More specifically, the hidden formatting unit 110 may divide data into a plurality of fields and then combine the fields to generate a transmission data frame structure.

Here, the transmission data frame structure will be described as follows.

Referring to FIG. 2, the hidden formatting unit 110 may transmit the data, which is digital information, by encrypting a header field, a payload field, and a cyclic redundancy check (CRC) field as hidden data, rather than transmitting the data as plain text.

Here, the fields may include a preamble field, a start frame delimiter (SFD) field, a nonce field, a covert SFD field, a header field, a payload field, and a CRC field.

A plaintext data frame is divided into a preamble field, an SFD field, a nonce field, a covert SFD field, a header field, a payload field, and a CRC field, and among the fields, the header field, the payload field, and the CRC field are generated as a hidden data field and encrypted as a hidden data frame by the hidden formatting unit 110. Details of each field will be described as follows.

The preamble field is a 2-byte field used for data start synchronization at a receiving end when data is transmitted, and has a fixed value of 0x0000. In addition, the preamble field is not encoded in a "hidden encoding" operation of the hidden encoding unit 120, which will be described below.

The SFD field is a 1-byte field indicating the start of an actual data frame, and has a fixed value of 0xA5.

The nonce field is a 2-byte field for synchronization of hash operations during transmission and reception, and in particular, is provided to allow a result value of a hash function to change every time.

The covert SFD field is a 2-byte field for synchronization of secure hash algorithm (SHA) operation results during transmission and reception, and uses the first and second bytes of the hash operation result. Upon reception, it is checked whether the received covert SFD field value are the same as the first and second byte values of the hash operation result using the previously received nonce field, the next fields transmitted afterward are subsequently received when the values are the same, and the operation returns to a state of waiting to receive a preamble field which is the initial state of reception when the values are not the same.

The header field is a 1-byte field indicating the length of data of the payload, which is actual digital information, and the CRC field is a 1-byte field for checking whether a bit loss is present in the received data, and performs a CRC operation on the header and the payload. Upon reception, when a CRC error is present, the data frame is discarded.

In a process of generating the hidden data field, the hidden formatting unit 110 performs a hash operation on the header field, the payload field, and the CRC field of the plaintext data frame structure and performs an exclusive-OR (XOR) operation on output values output through the hash operation, the output values starting from a third byte among the output values and corresponding to a length summating a length of the header field, a length of the payload field, and a length of the CRC to generate the hidden data field.

In addition, the hidden formatting unit 110 is configured to: with respect to the encrypted hidden data frame, set a value obtained by combining key data, SFD data, and nonce data as a hash function input value of the hidden data frame; allow a transmitting device and a receiving device sharing the hidden data frame to share the key data with each other; and allow the receiving device having received the hidden data frame from the transmitting device to perform a hash function operation on the hidden data frame based on the hash function input value, and perform an XOR operation on a result value of the hash function operation and the hidden data frame to reversely calculate the header field, the payload field, and the CRC field included in the plaintext data frame.

Here, the hash function input value is expressed as an equation below.

"Hash function(Key‖SFD‖nonce)"

In this case, the SFD field and the nonce field are values included in a data frame and transmitted, and the Key field is a value that is shareable in advance between a transmitting device and a receiving device. Therefore, when the receiving device having received the hidden data frame also performs a hash function operation and performs an XOR operation on a hash function result and the hidden data, the header field, the payload field, and the CRC field of the plaintext data frame that are intended to be transmitted first may be calculated reversely.

The above allows encryption to be performed using a hash function without using a block cipher, such as advanced encryption standard (AES) and is for easily calculating hidden data even in systems with a low computing power. Meanwhile, various hash functions, such as SHA, may be used as the hash function.

The hidden encoding unit 120 encodes the transmission data frame structure generated through the hidden formatting unit 110 to generate and output a hidden encoded bit stream.

More specifically, the hidden encoding unit 120 performs encoding to minimize the generation of wireless hidden signals in digital information bits of the transmission data frame structure output through the hidden formatting unit 110 and detect or correct a communication channel error. Unlike the conventional encoding method, the encoding process of the hidden encoding unit 120 satisfies two characteristics.

In the case of the first characteristic, the hidden encoding unit 120 may be configured to, among a plurality of first values (e.g., "0") and second bit values (e.g., "1") constituting the hidden encoded bit stream, form a distribution of the first bit values to be greater than a distribution of the second bit values.

This is because the second bit value, i.e., 1, is more likely to be modulated as a wireless hidden signal in the modulation operation, and by forming the distribution of the bit values 0 to be greater than the distribution of the bit values 1, the generation of hidden signals is minimized later.

In the case of the second characteristic, the hidden encoding unit 120 may be configured to, when a specific bit value is lost during transmission of a hidden encoded bit stream, recover the corresponding lost bit value. This weakens the strength of a hidden wireless signal or makes it difficult for the hidden wireless signal to be distinguished from a communication signal so that detection of the hidden wireless signal is made as difficult as possible during the wireless transmission of the hidden signal, and even when the weak strength of the wireless hidden signal leads to a "bit value loss situation" in which it is difficult to accurately determine whether a specific bit value is 0 or 1, the hidden encoding unit 120 may infer and recover the lost bit value based on a place in which the lost bit value is located in the hidden encoding bit stream, and based on whether a bit located before or after the lost bit value is 0 or 1.

Details thereof are described as follows.

Referring to FIG. 3, output bit values 0 and 1 of a hidden encoding bit stream output through the hidden encoding unit 120 according to the present invention do not refer to bit values of actual information (data). In the hidden coded bit stream, the number of bit values 0 represents an information bit value, and a bit value 1 simply serves as a "delimiter." That is, the hidden encoding unit 120 may insert and place a bit value 1 between a bit value 0 and a bit value 0 in the hidden encoding bit stream so that the number of bit values 0 may be identified.

Accordingly, the hidden encoding unit 120 may identify the actual information value by the number of bit values 0 between a bit value 1 and a bit value 1, and when the number of bit values 0 between a bit value 1 and a bit value 1 is four, the bit value of the actual information may be defined as 0, and when the number of bit values 0 between a bit value 1 and a bit value 1 is one, the bit value of the actual information may be defined as 1. The above is summarized as follows.

The bit value 0 of the actual information is encoded as 0000 on the hidden encoding bit stream by the hidden encoding unit 120, and the bit value 1 of the actual information is encoded as 0 on the hidden encoding bit stream. In this case, the delimiter "1" is always present between each bit value and may not be consecutively present.

Next, a process for the hidden encoding unit 120 to infer and recover a specific lost bit value is as follows.

[Table 1] below is a table showing the number of cases in which one specific bit value in a hidden encoded bit stream is lost.

TABLE 1

| Case | Received bit stream including lost bit | Received bit stream after recovery |
|---|---|---|
| 1 | 1X | 10 |
| 2 | X1 | 01 |
| 3 | 10X01 | 10101 |
| 4 | 100X01 | 100001 |
| 5 | 000X01 | 000101 |
| 6 | 10X000 | 101000 |
| 7 | 10X001 | 100001 |

Referring to [Table 1], a bit value denoted by X is a bit value that has been lost or is difficult to be distinguished as 0 or 1 in a wireless transmission process.

First, there is a case in which a bit value X next to 1 (a delimiter) is lost.

In this case, in a bit stream 1X, X is always 0. This is because 1 cannot be consecutively located after 1 in the hidden encoding process, 0 is always located after 1. Accordingly, in this case, the hidden encoding unit 120 recovers the hidden encoded bit stream by inserting 0 into the bit value of X.

Next, there is a case in which 1 is located after a lost bit value X.

In this case, X is always 0. This is because 1 cannot be consecutively located in the hidden encoding process. Accordingly, in this case, the hidden encoding unit 120 recovers the hidden encoded bit stream by inserting 0 into the bit value of X.

Next, there is a case in which 0 is located before and after a lost bit value X.

For example, in the case of 10X01, X is 1. This is because 000 is not present in the hidden encoding process. Accordingly, in this case, the hidden encoding unit 120 recovers the hidden encoded bit stream by inserting 1 into the bit value of X.

As another example, in the case of 100X01, X is 0. This is because 00 is not present in the hidden encoding process. Accordingly, in this case, the hidden encoding unit 120 recovers the hidden encoded bit stream by inserting 0 into the bit value of X.

As another example, in the case of 000X01, X is 1. This is because 00000 is not present in the hidden encoding process.

In the case of X00, the hidden encoding unit 120 identifies a bit value located after X00. In the case of 10X000, X is 1. This is because 00000 is not present in the hidden encoding process. In the case of 10X001, X is 0. This is because 00 is not present in the hidden encoding process.

Next, a process for the hidden encoding unit 120 to infer and recover two specific lost bit values is as follows.

[Table 2] below is a table showing the number of cases in which two specific bit values in a hidden encoded bit stream are consecutively lost.

TABLE 2

| Case | Received bit stream including lost bits | Received bit stream after recovery |
| --- | --- | --- |
| 1 | X?001 | 00001 |
| 2 | 1X?010 | 101010 |
| 3 | 1X?000 | 101000 |
| 4 | 0X?0000 | 0010000 |
| 5 | 0X?0001 | 0100001 |
| 6 | 10X?010 | 1000010 |
| 7 | 00X?010 | 0001010 |
| 8 | 10X?101 | 1010101 |
| 9 | 100X?101 | 10000101 |
| 10 | 000X?101 | 00010101 |
| 11 | 100X?100 | 10000100 |
| 12 | 000X?100 | 00010100 |

In [Table 2], bits marked with X? are two consecutive bit values that are lost or difficult to be distinguished as 0 or 1. The hidden encoding unit 120 simultaneously checks bit values before and after X? to perform recovery. Possible bit values before and after the loss bit values X? are in the form of 1X?0, 0X?0, and 0X?1. Possible bit values that are consecutively arranged after the lost bit values are 001, 000, 010, 101, and 100, that is, a total of five cases. Accordingly, the hidden encoding unit 120 may perform recovery using the five cases. In addition, in the hidden encoding process, only bit streams 1, 0, and 0000 are allowed to be present, and the remaining bit streams, such as 11, 00, 000, or 00000 are not present. Details of each case will be described as follows.

First, in the case of X?001, X? is 00 regardless of the bit value before X?001. This is because 00 and 000 are not present in the hidden encoding process.

Next, there is a case in which X occurs after 1 (a delimiter).

In the case of 1X?, the bit value 1, which is a delimiter, cannot be followed by another 1 consecutively, and thus is always followed by 0. Therefore, X after 1 becomes 0, and ? may be replaced by 0 or 1. In the case of 10?010, ? becomes 1. This is because 000 is not present in the hidden encoding process. Similarly, in the case of 10?000, ? becomes 1. This is because 00000 is not present in the hidden encoding process.

Next, there is a case in which X occurs after 0, such as 0X?000, 0X?010, 0X?101, or 0X?100 below.

Since a lost bit value occurs after a bit value 0, both 0 and 1 are possible for X, so that the hidden encoding unit 120 may, upon X? being followed by 000, perform recovery for two cases.

For example, in the case of 0X?0000, X? becomes 01. This is because 00, 000, and 00000 are not present in the hidden encoding process.

In addition, in the case of 0X?0001, X? becomes 10. This is because 00, 000, and 00000 are not present in the hidden encoding process.

In addition, in a case in which X? is followed by 010, the hidden encoding unit 120 determines two bit values before X.

In the case of 10X?010, X? becomes 00. This is because 00 is not present in the hidden encoding process.

In addition, in the case of 00X?010, X? becomes 01. This is because 00000 and 00 are not present in the hidden encoding process.

In addition, in a case in which X? is followed by 101, the hidden encoding unit 120 determines two or three bit values before X.

For example, in the case of 10X0101, X? becomes 10. This is because 00 and 000 are not present in the hidden encoding process.

In addition, in the case of 100X0101, X? becomes 00. This is because 00 and 000 are not present in the hidden encoding process.

In addition, in the case of 000X0101, X? becomes 10. This is because 00 and 0000 are not present in the hidden encoding process.

In addition, in a case in which X? is followed by 100, the hidden encoding unit 120 determines three bit values before X?.

For example, in the case of 100X0100, X? becomes 00. This is because 00 and 000 are not present in the hidden encoding process.

In addition, in the case of 000X0100, X? becomes 10. This is because 00 and 00000 are not present in the hidden encoding process.

With such a process, the hidden encoding unit 120 may infer a specific lost bit value of the hidden encoded bit stream and recover the specific lost bit value in reverse.

Next, the hidden modulation unit 130 serves to convert the hidden encoded bit stream into a wireless signal in a wireless transmission format.

The hidden modulation unit 130 converts the hidden encoded bit stream into a wireless signal, but when an input bit value (an input bit of hidden modulation) is 1, allows a wireless hidden signal (a wireless signal), which is a wireless signal that is not easily identified by a general user, to be transmitted through the transmitting device, and when an input bit value is 0, prevents a wireless hidden signal (a wireless signal) from being transmitted through the transmitting device, so that a general user may not detect wireless hidden signals.

Details thereof will be described as follows.

Figure 4:
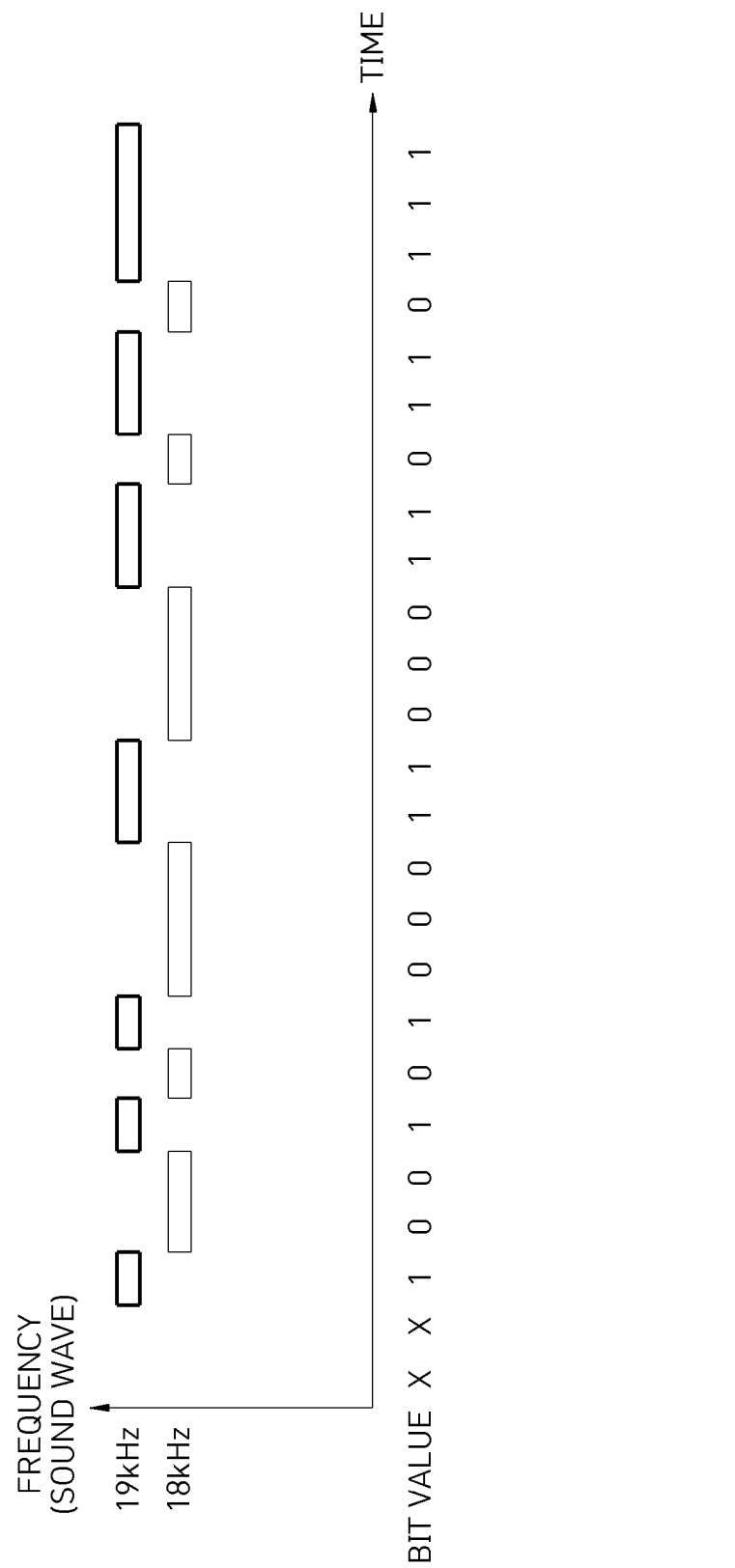
FIG. 4 is a graph illustrating a concept of a conventional hidden modulation method using different sound waves.
Figure 5:
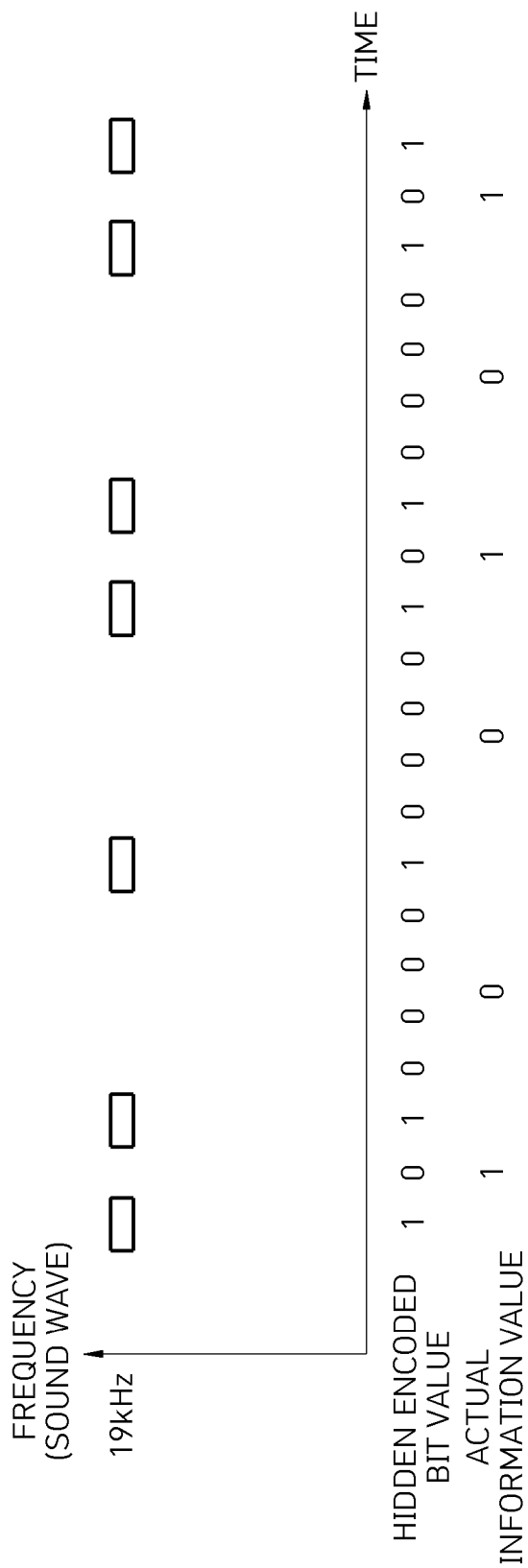
FIG. 5 is a graph illustrating a concept of performing hidden modulation using one sound wave in a hidden modulation unit 130.
Figure 6:
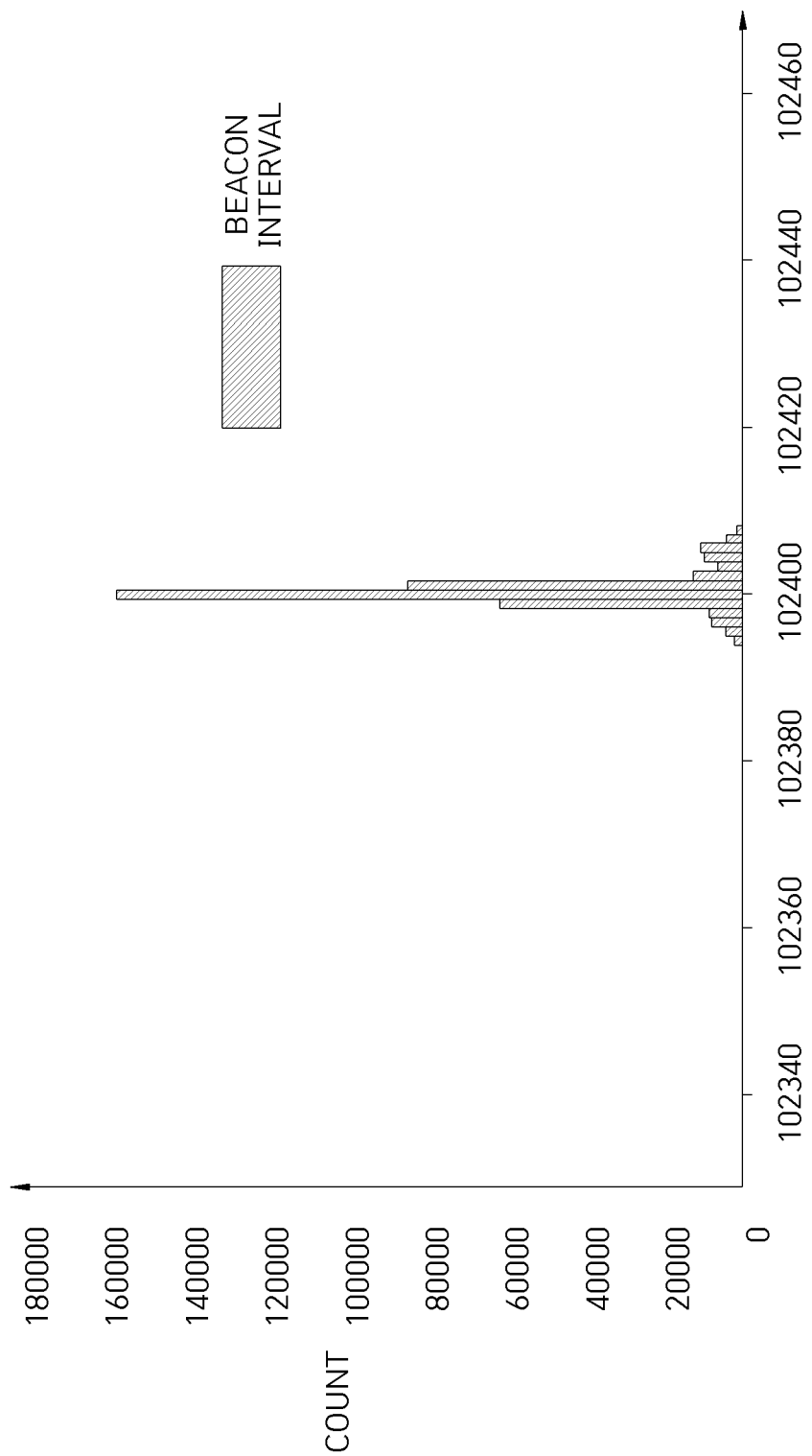
FIG. 6 is a graph showing a conventional beacon interval distribution.
Figure 7:
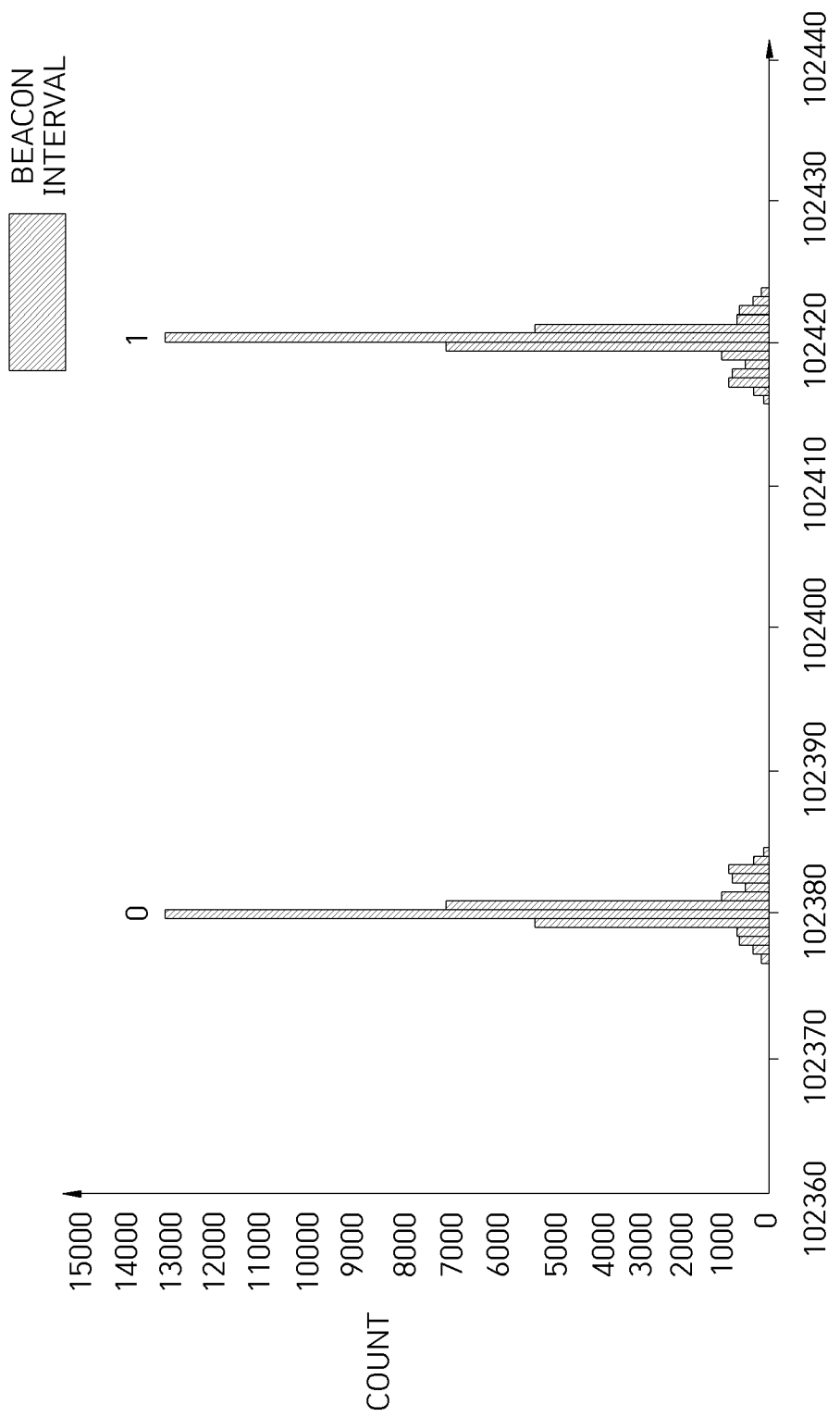
FIG. 7 is a graph illustrating a concept of a conventional hidden modulation method using a beacon interval.
Figure 8:
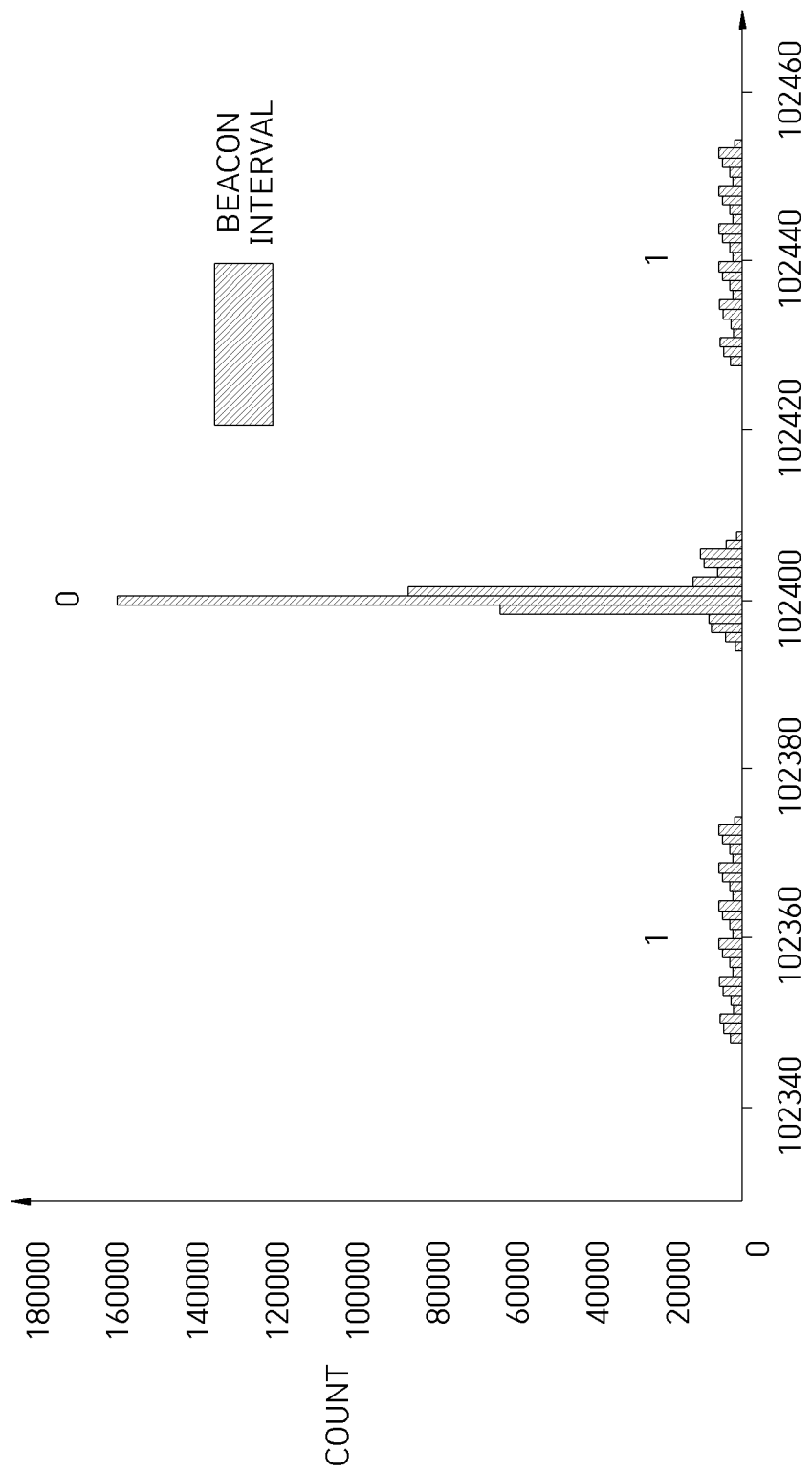
FIG. 8 is a graph illustrating a concept of performing hidden modulation using a beacon interval in a hidden modulation unit 130.

FIG. 4 is a graph illustrating a concept of a conventional hidden modulation method using different sound waves, FIG. 5 is a graph illustrating a concept of performing hidden modulation using one sound wave in a hidden modulation unit 130, FIG. 6 is a graph showing a conventional beacon interval distribution, FIG. 7 is a graph illustrating a concept of a conventional hidden modulation method using a beacon interval, and FIG. 8 is a graph illustrating a concept of performing hidden modulation using a beacon interval in a hidden modulation unit 130.

First, the first example is a method of secretly transmitting information using sound waves.

Referring to FIG. 4, an existing modulation method applied to when secretly transmitting data using sound waves is illustrated. Conventionally, two frequencies are used to distinguish "0" and "1." That is, when the bit value is "0," a sound wave of 18 kHz is generated, and when the bit value is "1," a sound wave of 19 kHz is used. For sound waves, the audible frequency range is 20 Hz to 20 kHz.

However, even at the audible frequencies, people have difficulty in detecting sound near 20 kHz, which is in a high frequency range. Therefore, in the related art, in order to secretly transmit information using sound waves, a high frequency range of 18 kHz to 20 kHz, which is difficult for ordinary people to perceive, is used.

The existing modulation method has two problems. The first problem is that high-frequency sound waves are continuously generated while bit values are being transmitted. The second problem is that a relatively low frequency is present because two frequencies are used. Due to these two problems, the existing method has a high possibility that modulated sound waves are found.

On the contrary, referring to FIG. 5, the hidden modulation unit 130 according to the present invention may distinguish "0" and "1" using one frequency. That is, when the bit value is "0," no sound wave is generated, and only when the bit value is "1," a sound wave of 19 kHz is used.

Such a modulation method of the hidden modulation unit 130 has two great advantages compared to the conventional modulation method.

The first advantage is that sound waves of high frequency are not continuously generated while bit values are being transmitted, and only when a value of bit value "1" is transmitted, a sound wave of 19 kHz is generated.

The second advantage is that only a high frequency is allowed to be used because only one frequency is used. Due to the advantages, sound wave signals generated by the present invention are significantly less likely to be found compared to sound wave signals generated by the conventional modulation method.

The second example is a method of secretly transmitting information using a beacon interval (a time interval of beacon signals) of WiFi.

Referring to FIGS. 6 and 7, in a WiFi wireless communication protocol, an access point (AP) notifies a service set identifier (SSID) thereof using a beacon frame. That is, a beacon frame is a broadcast frame with which an AP periodically notifies the presence of a wireless network under its control. The beacon frames are periodically transmitted at a predetermined time interval, and the time interval at which the beacon frames are transmitted is referred to a "beacon interval." When the beacon interval is set to 102.4 msec, the beacon frames are transmitted every 102.4 msec. However, even when the beacon frame is set to 102.4 msec, the beacon interval at which the beacon signals are actually transmitted has a slight time difference. FIG. 6 illustrates the distribution of the actual beacon interval when the AP sets the beacon interval to 102.4 msec.

In FIG. 7, the existing modulation method used when data is secretly transmitted using a beacon interval is illustrated. Referring to FIG. 7, "0" and "1" are distinguished using two beacon intervals. That is, based on 102.4 msec, a beacon interval lower than 102.4 msec is generated when the bit value is "0," and a beacon interval higher than 102.4 msec is generated when the bit value is "1."

However, in the case of the existing modulation method using the beacon interval, since a normal beacon interval value of 102.4 msec does not occur even once, there is a possibility that the beacon interval modulated by the existing method is easily recognized as being abnormal.

On the other hand, as shown in FIG. 8, the hidden modulation unit 130 according to the present invention may distinguish "0" and "1" using 102.4 msec, which is a normal beacon interval. That is, when the bit value is "0," a normal beacon interval of 102.4 msec is generated, and when the bit value is "1," a beacon interval lower or higher than 102.4 msec is periodically generated.

As described above, the hidden modulation method proposed in the present invention has advantages over the conventional modulation method. In the hidden modulation method proposed in the present invention, the number of normal beacon intervals is 2.5 times the number of abnormal beacon intervals (beacon intervals lower or higher than 102.4 msec). Therefore, beacon intervals generated by the hidden modulation are more difficult to be recognized as being abnormal compared to beacon intervals generated by the existing modulation method.

Such a configuration allows, when using wireless signals for communication such as Wi-Fi and LTE, signals in the normal range to be used more than signals outside the normal range, and thus the hidden wireless signals generated to transfer information requiring security are significantly less likely to be detected.

Figure 9:
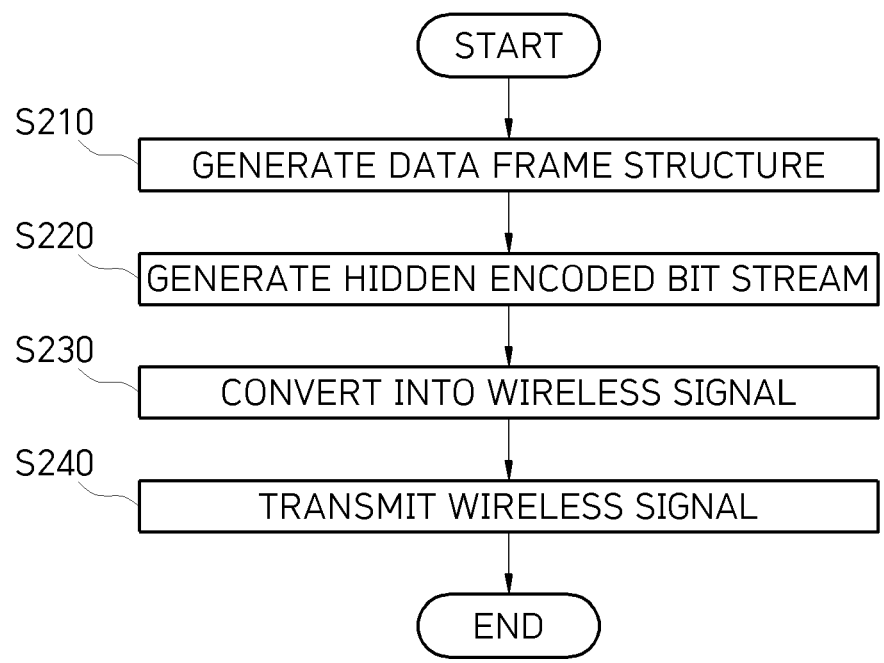
FIG. 9 is a flowchart for describing a method of transferring information using a wireless hidden signal according to the present invention.

FIG. 9 is a flowchart for describing a method of transferring information using a wireless hidden signal according to the present invention.

A method of transferring information using a wireless hidden signal according to the present invention includes operations 5210 to 5230 and may further include operation 5240.

Operation 5210 is an operation of generating a transmission data frame structure. This operation is an operation in which the hidden formatting unit 110 generates a transmission data frame structure based on data that needs to be transmitted wirelessly. The hidden formatting unit 110 may divide data into a plurality of fields and then combine the fields to generate a transmission data frame structure. The fields may include a preamble field, an SFD field, a nonce field, a covert SFD field, a header field, a payload field, and a CRC field. The hidden formatting unit 110 encrypts data corresponding to a plaintext data frame into a hidden data frame including a separate hidden data field.

Operation 5220 is an operation of generating and outputting a hidden encoded bit stream. This operation is an operation in which the hidden encoding unit 120 encodes the transmission data frame structure to generate and output a hidden encoded bit stream. The hidden encoding unit 120 generates the hidden encoded bit stream by a method of encoding each information bit value by repeating a first bit value a different number of times according to the information bit value, and arranging a second bit value between encoding results of neighboring information bit values. For example, the bit value 0 of the actual information is encoded as 0000 on the hidden encoding bit stream by the hidden encoding unit 120, and the bit value 1 of the actual information is encoded as 0 on the hidden encoding bit stream. In this case, the delimiter "1" is always present between each bit value, and may not be consecutively present.

Operation 5230 is a wireless signal conversion operation. This operation is an operation in which the hidden modulation unit 130 converts the outputted hidden encoded bit stream into a wireless signal in a wireless transmission format. The hidden modulation unit 130 converts the hidden encoded bit stream into a wireless signal, but when an input bit value of the hidden encoded bit stream is a first bit value (e.g., 0), prevents the converted wireless signal from being transmitted from the transmitting device to the receiving device, and when an input bit value of the hidden encoded bit stream is a second bit value (e.g., 1), allows the converted wireless signal (a wireless hidden signal) to be transmitted from the transmitting device to the receiving device.

Operation 5240 is an operation of transmitting a wireless signal. This operation is an operation in which the transmitting device transmits the converted wireless signal to the receiving device.

Meanwhile, the descriptions of FIGS. 1 to 8 may be applied to the descriptions of FIG. 9.

Figure 10:
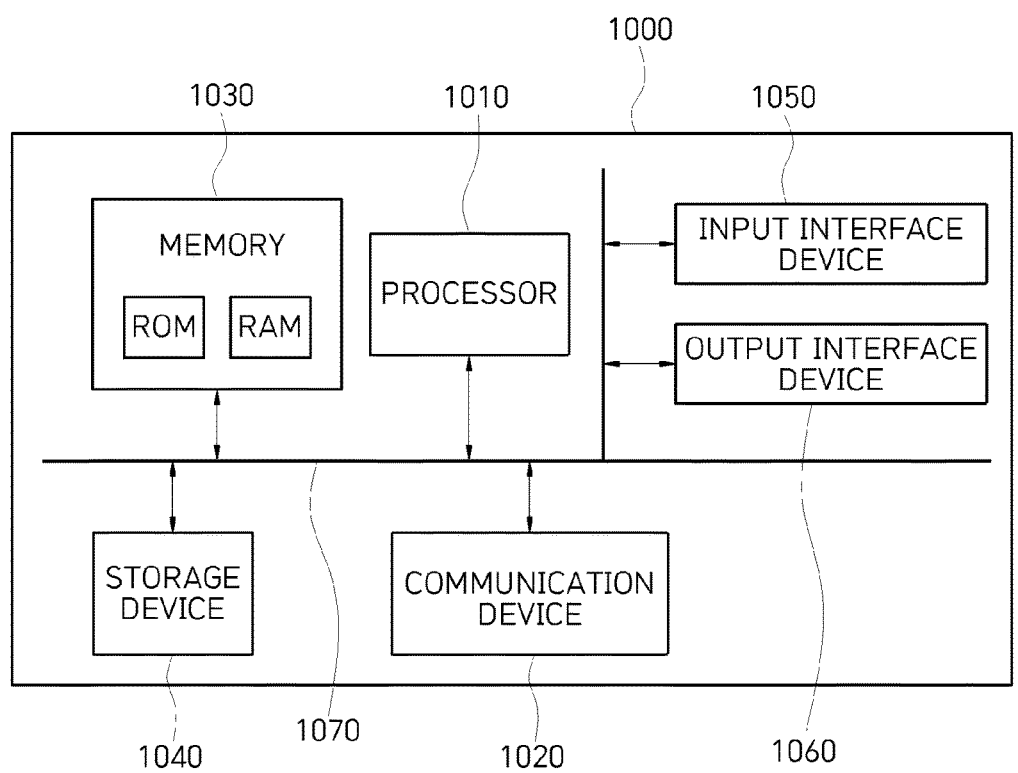
FIG. 10 is a block diagram illustrating a computer system for implementing a method according to an embodiment of the present invention.

FIG. 10 is a block diagram illustrating a computer system for implementing a method according to an embodiment of the present invention.

Referring to FIG. 10, a computer system 1000 may include at least one of a processor 1010, a memory 1030, an input interface device 1050, an output interface device 1060, and a storage device 1040 that communicate with each other via a bus 1070. The computer system 1000 may also include a communication device 1020 coupled to a network. The processor 1010 may be a central processing unit (CPU) or a semiconductor device that executes instructions stored in the memory 1030 or the storage device 1040. The memory 1030 and the storage device 1040 may include various types of volatile or nonvolatile storage media. For example, the memory 1030 may include a read only memory (ROM) and a random access memory (RAM). In the embodiment of the present disclosure, the memory 1030 may be located inside or outside the processor 1010, and the memory 1030 may be connected to the processor 1010 through various known devices. The memory 1030 is a volatile or non-volatile storage medium of various types. For example, the memory 1030 may include a ROM or a RAM.

Accordingly, an embodiment of the present invention may be implemented as a computer-implemented method or as a non-transitory computer-readable medium in which computer-executable instructions are stored. In one embodiment, when executed by a processor, computer readable instructions may perform a method according to at least one aspect of the present disclosure.

The communication device 1020 may transmit or receive a wired signal or a wireless signal.

In addition, the method according to the embodiment of the present invention may be implemented in the form of program instructions that can be executed through various computer devices, and recorded in a computer-readable medium.

The embodiments of the present invention can be implemented in the form of program instructions executable by a variety of computer components and may be recorded on a computer readable medium. The computer readable medium may include, alone or in combination, program instructions, data files and data structures. The program instructions recorded on the computer readable medium may be components specially designed for the embodiment of the present invention or may be known and usable by a skilled person in the field of computer software.

The computer readable medium may include a hardware device configured to store and execute program instructions. For example, the computer readable record media include magnetic media such as a hard disk, a floppy disk, or a magnetic tape, optical media such as a compact disc read only memory (CD-ROM) or a digital video disc (DVD), magneto-optical media such as floptical disks, a ROM, a RAM, a flash memory, and the like. The program instructions include not only machine language code made by a compiler but also high level code that is executable by a computer through an interpreter and the like.

As is apparent from the above, important information data requiring extreme security is transmitted using a wireless hidden signal and is allowed to be detected and distinguished by only promised transmitting/receiving parties so that the possibility of the wireless hidden signal being discovered can be minimized and security can be enhanced.

Although embodiments of the present invention have been described in detail above, the scope of the present invention is not limited thereto, and various modifications and improved forms of the present invention provided by those skilled in the art using the basic concept of the present invention as defined in the following claims also fall within the scope of the present invention.

What is claimed is:

1. A module for transferring information using a wireless hidden signal, the module comprising:
    a memory configured to store computer-readable instructions; and
    at least one processor configured to execute the instructions,
    wherein the at least one processor executes the instructions:
    to generate a transmission data frame structure based on data that needs to be wirelessly transmitted;
    to encode the generated transmission data frame structure to generate and output a hidden encoded bit stream; and
    to convert the output hidden encoded bit stream into a wireless signal in a wireless transmission format,
    wherein the at least one processor generates the hidden encoded bit stream using a method of repeating a first bit value a different number of times according to an information bit value to encode each information bit value and arranging a second bit value between encoding results of neighboring information bit values.

2. The module of claim 1, wherein the at least one processor divides the data into a plurality of fields and combines the fields to generate the transmission data frame structure.

3. The module of claim 2, wherein the fields include a preamble field, a start frame delimiter (SFD) field, a nonce field, a covert SFD field, a header field, a payload field, and a cyclic redundancy check (CRC) field.

4. The module of claim 1, wherein the at least one processor encrypts the data corresponding to a plaintext data frame into a hidden data frame including a separate hidden data field.

5. The module of claim 4, wherein the at least one processor performs a hash operation on a header field, a payload field, and a cyclic redundancy check (CRC) field of a structure of the plaintext data frame and perform an exclusive-OR (XOR) operation on output values output through the hash operation, the output values starting from a third byte among the output values and corresponding to a length summating a length of the header field, a length of the payload field, and a length of the CRC field to generate the hidden data field.

6. The module of claim 5, wherein the at least one processor is configured to, for the encrypted hidden data frame:
    set a value obtained by combining key data, SFD data, and nonce data as a hash function input value of the hidden data frame,
    allow a transmitting device and a receiving device sharing the hidden data frame to share the key data with each other, and
    allow the receiving device having received the hidden data frame from the transmitting device to perform a hash function operation on the hidden data frame based on the hash function input value, and perform an XOR operation on a result value of the hash function operation and the hidden data frame to reversely calculate the header field, the payload field, and the CRC field included in the plaintext data frame.

7. The module of claim 5, wherein the payload field is generated to have a capacity of 17 bytes.

8. The module of claim 1, wherein, among a plurality of first and second bit values constituting the hidden encoded bit stream, the at least one processor forms a distribution of the first bit values to be greater than a distribution of the second bit values.

9. The module of claim 1, wherein, when a specific bit value among first and second bit values included in the hidden encoded bit stream is lost, the at least one processor infers and recovers a lost specific bit value using a position of the corresponding lost specific bit value and positions of the first and second bit values in an entire array of the hidden encoded bit stream.

10. The module of claim 1, wherein the at least one processor converts the hidden encoded bit stream into the wireless signal, wherein:
when an input bit value of the hidden encoded bit stream is a first bit value, the converted wireless signal is prevented from being transmitted from a transmitting device to a receiving device; and
when an input bit value of the hidden encoded bit stream is a second bit value, the converted wireless signal is allowed to be transmitted from a transmitting device to a receiving device.

11. A method of transferring information using a wireless hidden signal, the method comprising:
generating a transmission data frame structure based on data that needs to be wirelessly transmitted;
encoding the generated transmission data frame structure to generate and output a hidden encoded bit stream; and
converting the output hidden encoded bit stream into a wireless signal in a wireless transmission format,
wherein the hidden encoded bit stream is generated using a method of repeating a first bit value a different number of times according to an information bit value to encode each information bit value and arranging a second bit value between encoding results of neighboring information bit values.

12. The method of claim 11, wherein the generating of the transmission data frame structure includes dividing the data into a plurality of fields, and combining the fields to generate the transmission data frame structure.

13. The method of claim 11, wherein the generating of the transmission data frame structure includes encrypting the data corresponding to a plaintext data frame into a hidden data frame including a separate hidden data field.

14. The method of claim 11, wherein the generation and output of the hidden encoded bit stream includes, among a plurality of first and second bit values constituting the hidden encoded bit stream, forming a distribution of the first bit values to be greater than a distribution of the second bit values.

15. The method of claim 11, wherein the converting of the output hidden encoded bit stream into the wireless signal includes converting the hidden encoded bit stream into the wireless signal, wherein:
when an input bit value of the hidden encoded bit stream is a first bit value, the converted wireless signal is prevented from being transmitted from a transmitting device to a receiving device; and
when an input bit value of the hidden encoded bit stream is a second bit value, the converted wireless signal is allowed to be transmitted from a transmitting device to a receiving device.

16. The method of claim 11, further comprising transmitting the wireless signal to a receiving device.

* * * * *